L. P. BODKIN.
Culinary-Vessels.

No. 150,461.　　　　　　　　　　　　Patented May 5, 1874.

WITNESSES.　　　　　　　　　　　　　　INVENTOR.
A. W. Almqvist.　　　　　　　　　　　　L. P. Bodkin
Sedgwick.
　　　　　　　　　　　　　　　BY
　　　　　　　　　　　　　　　　ATTORNEYS.

UNITED STATES PATENT OFFICE.

LAURENCE P. BODKIN, OF BROOKLYN, NEW YORK.

IMPROVEMENT IN CULINARY VESSELS.

Specification forming part of Letters Patent No. 150,461, dated May 5, 1874; application filed March 7, 1874.

*To all whom it may concern:*

Figure 1:
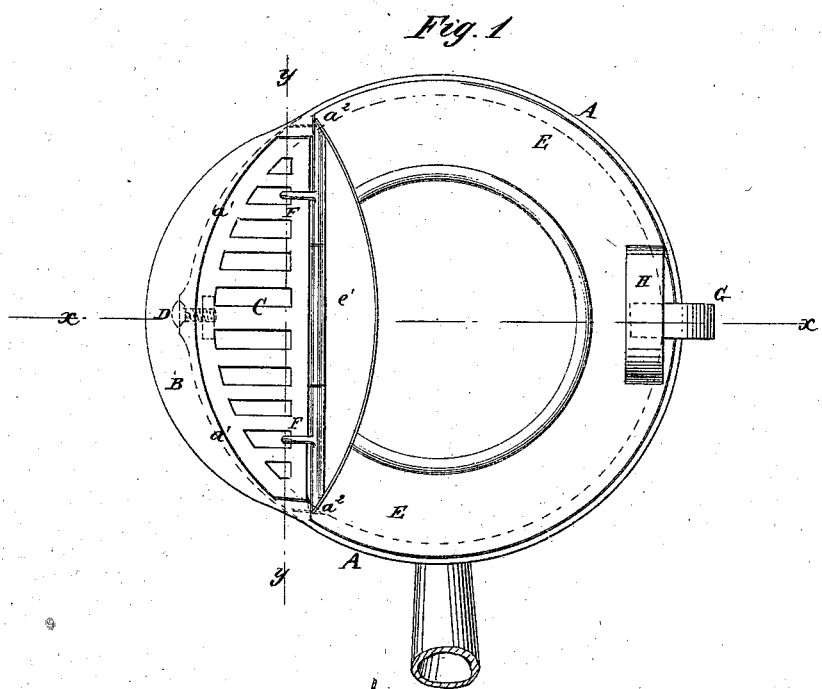
Figure 2:
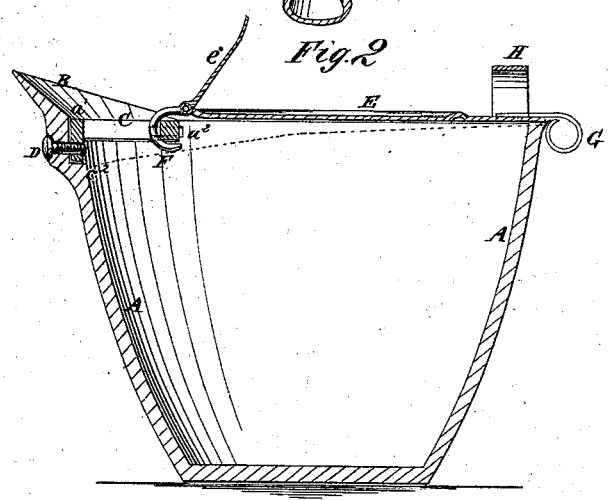
Figure 3:
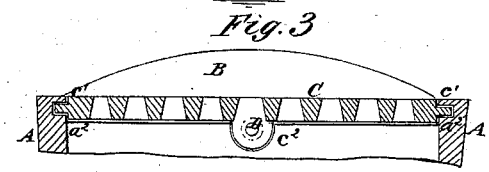

Be it known that I, LAURENCE P. BODKIN, of Brooklyn, in the county of Kings and State of New York, have invented a new and useful Improvement in Cooking-Vessels, of which the following is a specification:

Figure 1 is a top view of a sauce-pan to which my improvement has been applied, the flap of the cover being shown as turned back. Fig. 2 is a vertical section of the same, taken through the line $x\ x$, Fig. 1. Fig. 3 is a detail section taken through the line $y\ y$, Fig. 1.

Similar letters of reference indicate corresponding parts.

The invention will first be fully described, and then pointed out in the claims.

A represents the body of the vessel, which may be a pot, a sauce-pan, a preserve-kettle, or other vessel. Upon the edge of one side of the vessel A is formed a lip, B, inclining upward and outward, as shown in Figs. 1, 2, and 3, to serve as a spout in pouring out the liquid contents of the vessel, to prevent them from trickling down its sides, and to guide them into the receiving-vessel. The inner side of the edge of the vessel A, along the base of the lip B, has a rabbet, $a^1$, formed in it to receive the curved edge of the strainer C, short grooves $a^2$ being formed in the inner surface of the vessel A at the ends of the rabbet $a^1$, to receive tongues $c^1$, formed upon the ends of the strainer C. Upon the center of the curved edge of the strainer C is formed a downwardly-projecting lug, $c^2$, in which is formed a screw-hole to receive the screw D, which passes in through a hole in the side of the vessel A. The strainer C is thus secured in place by a single screw. This construction enables the vessels to be nested for transportation, the strainers being put in by the retailer. This construction also enables the inner surface of the vessels to be more conveniently polished than when the strainer is cast in a solid piece with the body of the vessel. E is the cover, which is made in two parts, hinged to each other at their straight edges, the smaller part or flap $e$ being about the size of the strainer C. To the larger part of the cover E, at or near its straight edge, are attached two hooks, F, to hook upon the inner bar of the strainer C, and thus securely connect the straight edge of said cover to the said strainer. To the center of the curved edge of the cover E is attached a spring-catch, G, which catches upon the edge of the vessel A, and thus secures the cover upon the said vessel. The cover E does not require to be held when pouring out the liquid contents of the vessel, and effectually prevents the steam from coming in contact with the hands of the operator, the loose flap $e'$ allowing the liquid contents of the vessel to flow out freely. The cover E is provided with a handle, H, for convenience in putting it on and taking it off.

Having thus described my invention, I claim as new and desire to secure by Letters Patent—

1. The combination of vessel A, having the rabbet $a^1$ and short grooves $a^2$, and the strainer C, having tongues $c^1$ and apertured lug $c^2$, with the single screw D, as and for the purpose described.

2. The combination of cover having two hooks, F F, with strainer C, having inner bar, arranged as and for the purpose set forth.

LAURENCE P. BODKIN.

Witnesses:
JAMES T. GRAHAM,
T. B. MOSHER.